No. 623,360. Patented Apr. 18, 1899.
C. I. FOSTER.
BEE FEEDER.
(Application filed Sept. 28, 1898.)

(No Model.)

Witnesses:
Chas. P. Schnelz
Heath Sutherland

Inventor:
C. I. Foster,
By his Attorney
F. A. Richards.

UNITED STATES PATENT OFFICE.

CHARLES I. FOSTER, OF MERIDEN, CONNECTICUT, ASSIGNOR OF ONE-HALF TO GEORGE A. FOSTER, OF SAME PLACE.

BEE-FEEDER.

SPECIFICATION forming part of Letters Patent No. 623,360, dated April 18, 1899.

Application filed September 28, 1898. Serial No. 692,085. (No model.)

*To all whom it may concern:*

Be it known that I, CHARLES I. FOSTER, a citizen of the United States, residing in Meriden, in the county of New Haven and State of Connecticut, have invented certain new and useful Improvements in Bee-Feeders, of which the following is a specification.

This invention relates to bee-feeders; and the object of the invention is to provide a simple and efficient device of this character adapted for attachment to a beehive and so constructed as to prevent access of bees thereinto except through the interior of the hive, by reason of which robber-bees cannot get into the feeder and appropriate the food, and said bee-feeder has an opening adapted to register with a similar opening in a wall of the hive and through which the bees can pass.

My improved bee-feeder consists in the present case of a casing and a tank for containing the feed, removably supported in the same, said tank having communicating compartments or chambers, one of which is somewhat larger than the other. The casing and tank are separated by an air-space whereby the feed, which is generally a saccharine liquid, is prevented from being materially reduced in temperature. The casing is constructed, preferably, of wood, while the tank is of metal, and its compartments are separated by a wall or partition which extends nearly to the floor thereof, whereby an opening is formed between said wall and floor, through which the food placed in the smaller compartment will pass and enter the other compartment, which latter serves as a chamber in which the bees may collect to feed, the bees while doing so resting upon a float which rises and falls with the liquid in said larger chamber.

For the purpose of preventing access of bees to the feeder except through the hive, the casing will preferably be provided with a removable lid adapted to cover both compartments of the tank.

Figure 1:
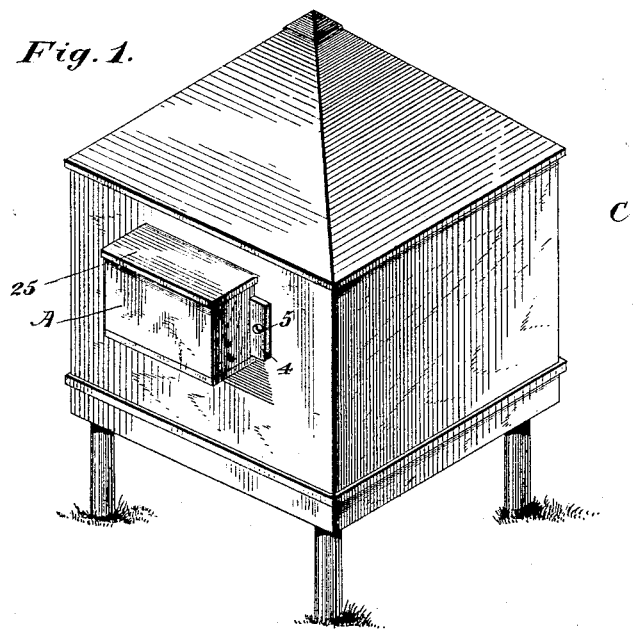
Figure 2:
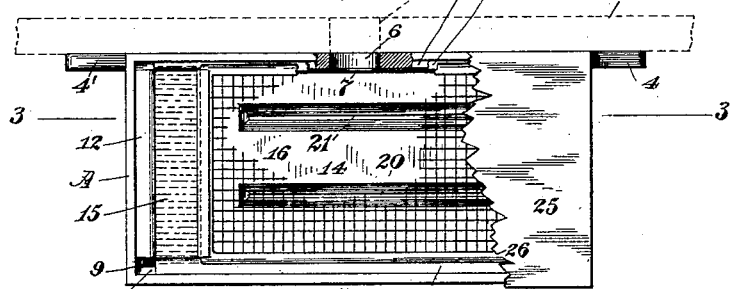
Figure 3:
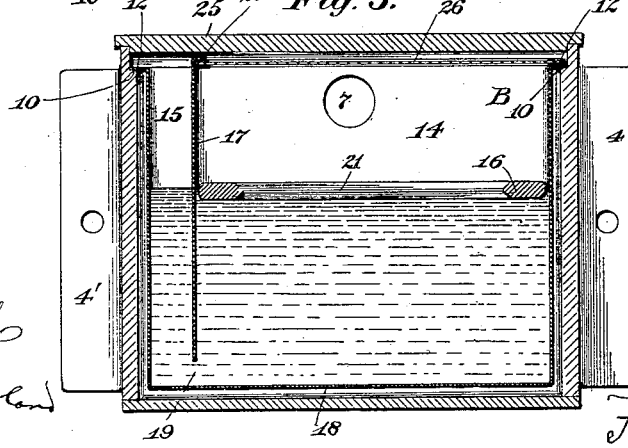

In the drawings accompanying and forming part of this specification, Figure 1 is a perspective view of a beehive provided with one of my improved feeders attached thereto in its usual position. Fig. 2 is a plan view with a portion of the lid or cover broken away, part of the inner walls of the casing and tank being shown in section and illustrates by dotted lines a portion of the rear wall of the hive. Fig. 3 is a cross-sectional view taken on line 3 3, Fig. 2.

Similar characters designate like parts in all the figures of the drawings.

My bee-feeder, which is adapted for attachment to any of the ordinary forms of hives, involves in its construction a casing A and a tank B, the former being adapted to be secured to the hive, while the latter contains the food for the bees.

In the drawings I have represented a hive C of usual construction, and the casing A, which is preferably of wood, may be provided at its opposite ends with flanges or ears, as 4 and 4', through which screws, as 5, may be passed to hold the device closely against the wall of the hive.

The inner walls of the casing A and tank B have openings, as 6 and 7, respectively, adapted to register with each other and with an opening 8 in the hive, through which the bees can pass from the interior of said hive.

The tank B is supported in the external casing A and is separated therefrom by an air-space 9, which protects the feed from being materially reduced in temperature.

The casing or box A is provided near its upper edge with a ledge or shoulder 10, upon which the outwardly-projecting flanges 12 at the upper end of the tank B rest, whereby said tank may be quickly removed for cleansing purposes. The tank is divided into two compartments, as 14 and 15, by the wall or partition 17, which extends nearly to the floor 18, the first-mentioned compartment being larger than the other and forming a chamber in which the bees may collect to feed, the bees alighting upon the float 16, which rests upon the liquid food in the chamber.

The food is supplied to the smaller chamber 15 and from thence flows through the opening 19, between the lower edge of the partition 17 and the floor 18, into the larger or feeding chamber 14, the float of course rising with the liquid and said float having a series of elongated slots, as 20 and 21, through which the bees can reach the food.

These feeders are ordinarily utilized in cold weather when bees cannot procure their food from natural sources, and for the purpose of preventing the entrance of robber-bees or other insects to the feeding-chamber the casing A is provided with a lid 25, which covers both chambers 14 and 15.

In warm weather it is sometimes desirable to remove the lid or cover 25 to permit of light and ventilation, and when this is done means are provided to prevent the entrance of insects into the chamber 14, said means consisting of a foraminous plate 26, adapted to rest upon the flanges 12 and to be held against displacement by the overhanging flange 27 at the upper end of the dividing-wall 17, as clearly shown in Figs. 2 and 3.

It will be seen on inspection of Fig. 2 that the outer or rear wall of the removable tank B is imperforate, while the opposite wall has an opening 7, and by virtue of this construction said tank may be reversed to bring said imperforate portion of the rear wall thereof opposite the opening 6 in the casing A, thereby covering the same and the opening 8 of the hive, this expedient being adopted in warm weather to prevent the entrance of bees from the hive into the feeding-chamber, thereby obviating the necessity of detaching the feeder when the bees can obtain their natural food.

Having described my invention, I claim—

1. A bee-feeder comprising a casing provided with means by which it may be attached to a hive and having an opening communicating with a similar opening in said hive; a ledge or shoulder within the casing; a tank flanged at its upper end and divided into compartments, one of which is to contain the material to be fed to the bees, said tank having an opening in one wall adapted to register with the openings in the casing and hive and also having an imperforate wall, the flanges of the tank resting upon the ledge or shoulder of the casing and serving to separate the tank from the casing by an air-space as described; and means within the feed-compartment of the tank upon which the bees may alight to take their food.

2. A bee-feeder comprising a casing having an interior ledge or shoulder on the sides and ends of the same, said casing having an opening communicating with a similar opening in the hive; a tank having flanges resting upon said ledge or shoulder and serving to separate the tank from the casing by an air-space, said tank having a perforation adapted to register with the openings aforesaid, and also having a plain wall which when the tank is reversed will close said perforations; a flanged partition within the tank; a foraminous cover held in place by the flange of said partition; and a cover for the tank and casing, substantially as and for the purpose specified.

CHARLES I. FOSTER.

Witnesses:
F. S. FOSTER,
GEORGE A. FOSTER.